(12) United States Patent
Murakami et al.

(10) Patent No.: US 12,347,627 B2
(45) Date of Patent: Jul. 1, 2025

(54) MULTILAYER ELECTRONIC DEVICE

(71) Applicant: TDK CORPORATION, Tokyo (JP)

(72) Inventors: Taku Murakami, Tokyo (JP); Nobuto Morigasaki, Tokyo (JP); Takuma Ariizumi, Tokyo (JP); Yoshitaka Nagashima, Tokyo (JP); Tsubasa Aoki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 120 days.

(21) Appl. No.: 18/498,794

(22) Filed: Oct. 31, 2023

(65) Prior Publication Data

US 2024/0177936 A1 May 30, 2024

(30) Foreign Application Priority Data

Nov. 25, 2022 (JP) ................................. 2022-188540

(51) Int. Cl.
*H01G 4/30* (2006.01)
*H01G 4/008* (2006.01)
*H01G 4/012* (2006.01)
*H01G 4/12* (2006.01)

(52) U.S. Cl.
CPC ............... *H01G 4/30* (2013.01); *H01G 4/008* (2013.01); *H01G 4/012* (2013.01); *H01G 4/1227* (2013.01)

(58) Field of Classification Search
CPC ............ H01G 4/30; H01G 4/32; H01G 4/008; H01G 4/012; H01G 4/1227
See application file for complete search history.

(56) References Cited

U.S. PATENT DOCUMENTS

| | | | |
|---|---|---|---|
| 9,093,220 B1* | 7/2015 | Kitano | H01G 4/1218 |
| 2009/0310279 A1* | 12/2009 | Sasabayashi | H01G 4/1227 |
| | | | 361/321.4 |
| 2016/0002111 A1* | 1/2016 | Yoon | H01G 4/1227 |
| | | | 501/138 |
| 2016/0005543 A1 | 1/2016 | Wada et al. | |
| 2016/0118188 A1* | 4/2016 | Wada | C04B 35/4682 |
| | | | 29/25.42 |
| 2017/0076869 A1* | 3/2017 | Okai | H01G 4/228 |

(Continued)

FOREIGN PATENT DOCUMENTS

WO 2014/148133 A1 9/2014

Primary Examiner — Michael P McFadden
(74) Attorney, Agent, or Firm — Oliff PLC

(57) ABSTRACT

A multilayer electronic device includes an element body including an interior region and an exterior region and a pair of external electrodes. The interior region includes inner dielectric layers and internal electrode layers laminated alternately. The exterior region is disposed outwards from the interior region in a lamination direction. The pair of external electrodes is disposed on a surface of the element body and connected to the internal electrode layers. $D_{RAa}<D_{RAb}<D_{RAc}$ and $D_{RBa}>D_{RBb}>D_{RBc}$ are satisfied, where "RA" includes an element having a highest mole ratio among "RE" in the inner dielectric layers of a third region at a center of the interior region in the lamination direction, "RB" includes an element having a highest mole ratio among "RE" in a first region at a center of the exterior region in the lamination direction, and "RA" and "RB" are different from each other.

4 Claims, 6 Drawing Sheets

(56) References Cited

U.S. PATENT DOCUMENTS

| | | | |
|---|---|---|---|
| 2017/0133156 A1 | 5/2017 | Wada et al. | |
| 2018/0261390 A1* | 9/2018 | Sakate | H01G 4/30 |
| 2019/0057813 A1* | 2/2019 | Okamoto | H01G 4/1227 |
| 2019/0115153 A1* | 4/2019 | Park | H01G 4/224 |
| 2019/0355519 A1* | 11/2019 | Taniguchi | H01G 4/232 |
| 2021/0210288 A1* | 7/2021 | Kang | C04B 35/49 |
| 2022/0102076 A1* | 3/2022 | Isota | H01G 4/008 |

* cited by examiner

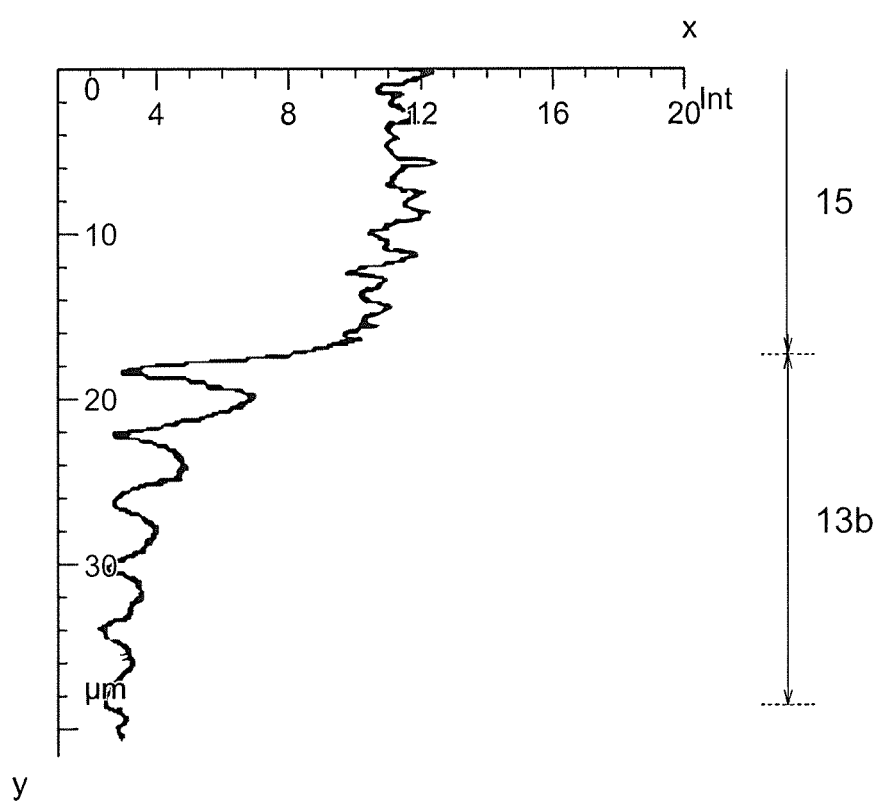

MULTILAYER ELECTRONIC DEVICE

The present application claims priority on the basis of Japanese patent application No. 2022-188540 filed on Nov. 25, 2022, which is incorporated herein by reference in its entirety.

TECHNICAL FIELD

The present invention relates to a multilayer electronic device.

BACKGROUND

Patent Document 1 (WO 2014/148133) discloses a technique that enables a multilayer ceramic capacitor to be readily mounted on a substrate or a board in consideration of the positional relationship between the substrate or the board and internal electrodes of the multilayer ceramic capacitor by virtue of the difference in color, which enables the laminating direction of the internal electrodes to be confirmed from the appearance of the multilayer ceramic capacitor, between a surface of a first outer layer of a laminated body of the multilayer ceramic capacitor and a surface of an inner portion thereof.

Meanwhile, both improvement of moisture resistance and reduction of cracks at the time of high-voltage application have been in demand from the market.

SUMMARY

The present invention has been achieved under such circumstances. It is an object of the present invention to provide a multilayer electronic device both having high moisture resistance and having less cracks at the time of high-voltage application.

To achieve the above object, a multilayer electronic device according to the present invention is a multilayer electronic device including:

- an element body including an interior region and an exterior region, the interior region including inner dielectric layers and internal electrode layers laminated alternately, the exterior region including an outer dielectric layer and being disposed outwards from the interior region in a lamination direction; and
- a pair of external electrodes disposed on a surface of the element body and connected to the internal electrode layers, wherein the inner dielectric layers and the outer dielectric layer include a main component and a subcomponent, the main component being included in a main phase grain of the inner dielectric layers and a main phase grain of the outer dielectric layer and having a perovskite crystal structure represented by a general formula $ABO_3$, and the subcomponent including "RE", "M", and Si, where "A" includes at least one selected from the group consisting of Ba, Sr, and Ca, "B" includes at least one selected from the group consisting of Ti, Zr, and Hf, "RE" includes at least one selected from the group consisting of Yb, Y, Ho, Dy, Tb, Gd, and Eu, and "M" includes at least two selected from the group consisting of Mg, Mn, V, and Cr; and $D_{RAa} < D_{RAb} < D_{RAc}$ and $D_{RBa} > D_{RBb} > D_{RBc}$ are satisfied, where "RA" includes an element having a highest mole ratio among "RE" in the inner dielectric layers of a third region at a center of the interior region in the lamination direction, "RB" includes an element having a highest mole ratio among "RE" in a first region at a center of the exterior region in the lamination direction, "RA" and "RB" are different from each other, $D_{RAa}$ is an "RA" content of the first region in terms of $RA_2O_3$ with respect to 100 parts by mol of the main component in the first region, $D_{RAb}$ is an "RA" content of the inner dielectric layers of a second region in terms of $RA_2O_3$ with respect to 100 parts by mol of the main component in the inner dielectric layers of the second region, the second region being disposed in the interior region and outwards from the third region in the lamination direction, $D_{RAc}$ is an "RA" content of the inner dielectric layers of the third region in terms of $RA_2O_3$ with respect to 100 parts by mol of the main component in the inner dielectric layers of the third region, $D_{RBa}$ is an "RB" content of the first region in terms of $RB_2O_3$ with respect to 100 parts by mol of the main component in the first region, $D_{RBb}$ is an "RB" content of the inner dielectric layers of the second region in terms of $RB_2O_3$ with respect to 100 parts by mol of the main component in the inner dielectric layers of the second region, and $D_{RBc}$ is an "RB" content of the inner dielectric layers of the third region in terms of $RB_2O_3$ with respect to 100 parts by mol of the main component in the inner dielectric layers of the third region.

The multilayer electronic device according to the present invention can have both high moisture resistance and less cracks (hereinafter, cracks may be referred to as electrostrictive cracks) at the time of high-voltage application.

Specifically, because the exterior region is sufficiently fired for the inner dielectric layers and the outer dielectric layer of the multilayer electronic device according to the present invention have the compositions, particularly "RE" and its content, satisfying the conditions described above, porosity of the exterior region can be reduced for its densification, which can result in improvement of moisture resistance.

Also, because gradual changes in the concentrations of "RA" and "RB" from the exterior region to the interior region cause a gradual change in the sintering behavior from the exterior region to the interior region, difference between stress in the exterior region and stress in the interior region can be reduced, which can result in reduction of electrostrictive cracks.

Preferably, $C_{REc} > C_{REa}$ is satisfied, where $C_{REa}$ is an "RE" content of the first region in terms of $RE_2O_3$ in 100 parts by mass of the first region, and $C_{REc}$ is an "RE" content of the inner dielectric layers of the third region in terms of $RE_2O_3$ in 100 parts by mass of the inner dielectric layers of the third region.

Lowering the "RE" content of the exterior region to satisfy $C_{REc} > C_{REa}$ can further reduce the porosity of the exterior region. Consequently, failures can be further prevented or reduced even at a high external humidity, and moisture resistance can be further improved.

Preferably, $D_{RBa}$ is 0.7 parts by mol or more; preferably, $D_{RAc}$ is 0.7 parts by mol or more; and preferably, $D_{RAc}/D_{RAa} \geq 3$ is satisfied.

This can further reduce the porosity of the exterior region. Consequently, failures can be further prevented or reduced even at a high external humidity, and moisture resistance can be further improved. Also, because resistance increases due to a sufficient amount of "RA" solid-dissolving in the main phase grain of the inner dielectric layers, a locally high current density under a high electric field can be prevented, which can further ensure reliability under a highly humid environment.

Preferably, $r1<r2<r3<r4<r5$ and $r5/r1>2.0$ are satisfied, provided that $r_n$ (n=1 to 5) is a ratio ($D_{RAn}/D_{RBn}$) of $D_{RAn}$ to $D_{RBn}$ of an n-th layer of the inner dielectric layers in the lamination direction, where n-th is any ordinal number from first (n=1) to fifth (n=5), the first corresponding to an outermost layer of the inner dielectric layers, $D_{RAn}$ is an "RA" content of the n-th layer in terms of $RA_2O_3$ with respect to 100 parts by mol of the main component in the n-th layer, and $D_{RBn}$ is an "RB" content of the n-th layer in terms of $RB_2O_3$ with respect to 100 parts by mol of the main component in the n-th layer.

This can further improve moisture resistance and further reduce electrostrictive cracks. Gradual changes in the concentrations of "RA" and "RB" from the first layer to the fifth layer of the inner dielectric layers can further reduce the difference between stress in the exterior region and stress in the interior region, enabling reduction of electrostrictive cracks.

BRIEF DESCRIPTION OF THE DRAWING(S)

FIG. 2B is a graph showing changes in the Y content of FIG. 2A.

DETAILED DESCRIPTION

Figure 1A:
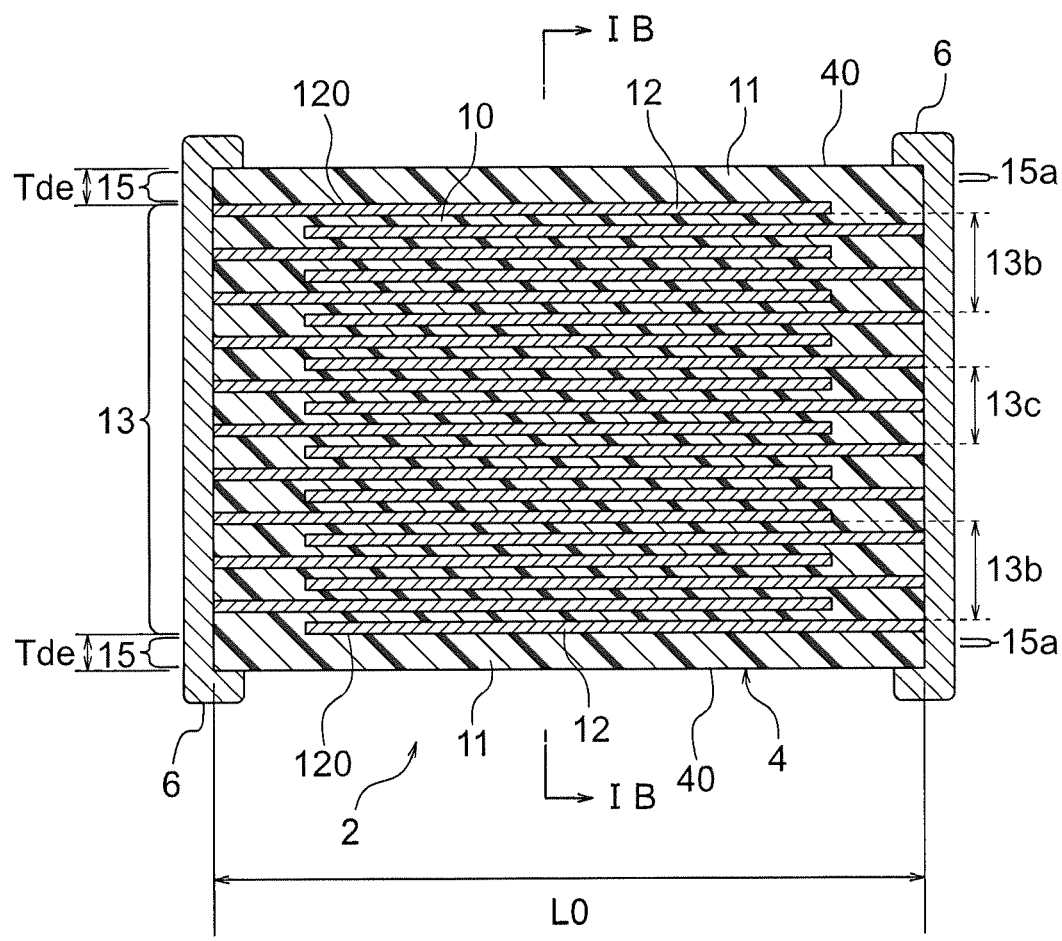
FIG. 1A is a schematic sectional view of a multilayer ceramic capacitor.
Figure 1B:
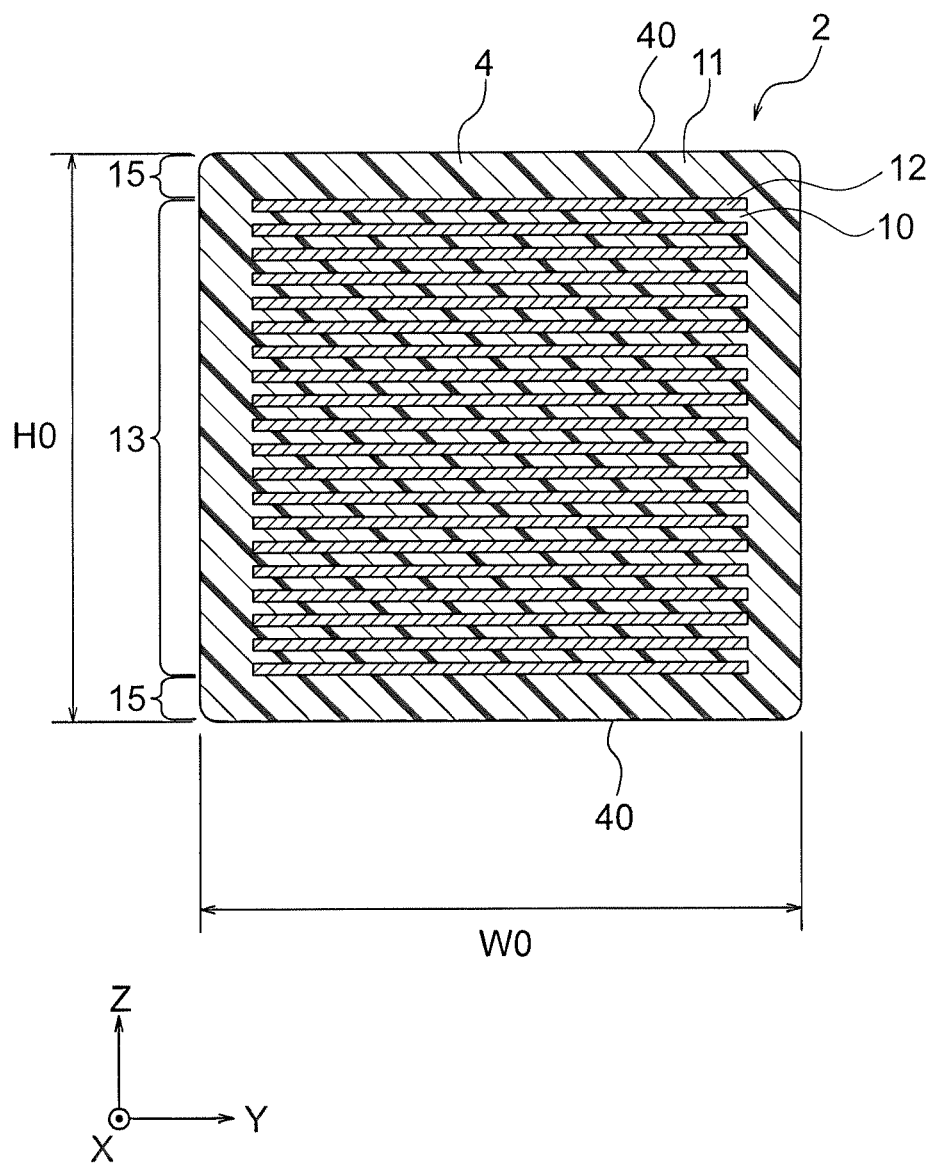
FIG. 1B is a schematic sectional view of the multilayer ceramic capacitor along line IB-IB of FIG. 1A.

<1. Multilayer Ceramic Capacitor>
1.1 Overall Structure of Multilayer Ceramic Capacitor FIGS. 1A and 1B show a multilayer ceramic capacitor 2 as an example of a multilayer electronic device according to the present embodiment. The multilayer ceramic capacitor 2 includes an element body 4. The element body 4 includes an interior region 13 and exterior regions 15. The interior region 13 includes inner dielectric layers 10 and internal electrode layers 12, which are substantially parallel to a plane containing the X-axis and the Y-axis, and has a structure in which the inner dielectric layers 10 and the internal electrode layers 12 are alternately laminated along the Z-axis direction. The exterior regions 15 are located outwards from the interior region 13 in the lamination direction (Z-axis direction).

The X-axis, the Y-axis, and the Z-axis are mutually perpendicular.

The word "inner" means closer to a center of the multilayer ceramic capacitor 2, and the word "outer" means farther from the center of the multilayer ceramic capacitor 2.

The phrase "substantially parallel" means that the inner dielectric layers 10 and the internal electrode layers 12 are mostly parallel to the plane but may partly be slightly nonparallel. The inner dielectric layers 10 and the internal electrode layers 12 may slightly be uneven or inclined.

According to FIG. 1A, end surfaces of the element body 4 in the X-axis direction are flat. In other words, the inner dielectric layers 10 and the internal electrode layers 12 are laminated so as to be flush with each other. However, the end surfaces of the element body 4 in the X-axis direction may be partly non-planar. Moreover, the inner dielectric layers 10 and the internal electrode layers 12 may not be flush with each other. For example, the inner dielectric layers 10 and the internal electrode layers 12 may be laminated so that the inner dielectric layers 10 are partly scraped off or the internal electrode layers 12 are partly protruding.

The exterior regions 15 are made up of outer dielectric layers 11. The exterior regions 15 may have a single-layer structure including only one outer dielectric layer 11 or may have a multilayer structure including multiple outer dielectric layers 11.

At both ends of the element body 4, the element body 4 is provided with a pair of external electrodes 6, which electrically connect to the internal electrode layers 12 alternately arranged inside the element body 4. The element body 4 may have any shape but normally has a rectangular parallelepiped shape. The element body 4 may have any dimensions appropriately determined based on usage.

In the present embodiment, the element body 4 may have a lengthwise dimension L0 (see FIG. 1A) of 7.5 to 0.4 mm, a widthwise dimension W0 (see FIG. 1B) of 6.3 to 0.2 mm, and a height dimension H0 (see FIG. 1B) of 6.3 to 0.2 mm.

Examples of specific L0×W0 dimensions of the element body 4 include (7.5±0.4) mm×(6.3±0.4) mm, (5.7±0.4) mm×(5.0±0.4) mm, (4.5±0.4) mm×(3.2±0.4) mm, (3.2±0.3) mm×(2.5±0.2) mm, (3.2±0.3) mm×(1.6±0.2) mm, (2.0±0.2) mm×(1.2±0.1) mm, (1.6±0.2) mm×(0.8±0.1) mm, (1.0±0.1) mm×(0.5±0.05) mm, (0.6±0.06) mm×(0.3±0.03) mm, and (0.4±0.04) mm×(0.2±0.02) mm. H0 is not limited and is, for example, approximately equivalent to or smaller than W0.

1.2 Internal Electrode Layers

In the present embodiment, the internal electrode layers 12 are laminated so that their ends are alternately exposed to surfaces of the two end surfaces of the element body 4 facing each other.

The internal electrode layers 12 may include any conductive material. Examples of noble metals that may be used as the conductive material include Pd, Pt, and Ag—Pd alloys. Examples of base metals that may be used as the conductive material include Ni, Ni based alloys, Cu, and Cu based alloys. Various trace components, such as P and/or S, may constitute about 0.1 mass % or less of Ni, Ni based alloys, Cu, or Cu based alloys. A commercially available electrode paste may be used to form the internal electrode layers 12. The thickness of the internal electrode layers 12 is determined as appropriate based on usage or so.

1.3 External Electrodes

The external electrodes 6 may include any conductive material. For example, a known conductive material, such as Ni, Cu, Sn, Ag, Pd, Pt, Au, their alloys, and conductive resin, is used. The thickness of the external electrodes 6 is determined as appropriate based on usage or so.

1.4 Dielectric Layers

In the present embodiment, the inner dielectric layers 10 and the outer dielectric layers 11 may collectively be referred to as dielectric layers.

The thickness (inter-layer thickness) of each inner dielectric layer 10 is not limited and can be determined based on desired characteristics, usage, etc. Normally, the inter-layer thickness may be 20 μm or less, 10 μm or less, or 5 μm or less. The number of the inner dielectric layers 10 is preferably ten or more. For example, the number of the inner dielectric layers 10 may be 50 or more, 100 or more, or 200 or more.

The thickness (inter-layer thickness) of each outer dielectric layer 11 is not limited and can be, for example, the same as the inter-layer thickness of the inner dielectric layers 10. Despite having a thin thickness of the outer dielectric layers 11, the multilayer ceramic capacitor 2 according to the present embodiment can be moisture resistant and can have less cracks at the time of high-voltage application. The number of the outer dielectric layers 11 in each exterior region 15 is not limited and may be, for example, 5 or more or 20 or more.

The dielectric layers (the inner dielectric layers 10 and the outer dielectric layers 11) according to the present embodiment include main phase grains (dielectric grains).

The main phase grains of the present embodiment include a compound having a perovskite crystal structure represented by $ABO_3$ as a main component. The main component of the main phase grains is a component constituting 80 to 100 parts by mass or preferably 90 to 100 parts by mass of 100 parts by mass of the main phase grains. The main phase grains may include other components besides the main component. For example, the main phase grains may include a barium (Ba) compound.

"A", i.e., the A-site element, of $ABO_3$ includes at least one selected from the group consisting of Ba, strontium (Sr), and calcium (Ca) or may include at least one selected from Ba and Sr. 100 parts by mol of "A" may include at least 80 parts by mol of Ba or at least 90 parts by mol of Ba. "A" may include only Ba.

"B", i.e., the B-site element, of $ABO_3$ includes at least one selected from the group consisting of titanium (Ti), zirconium (Zr), and hafnium (Hf). "B" may include at least one selected from Ti and Zr. 100 parts by mol of "B" may include at least 70 parts by mol of Ti or at least 80 parts by mol of Ti. "B" may include only Ti.

Provided that "A" includes at least one selected from the group consisting of Ba, Sr, and Ca and "B" includes at least one selected from Ti and Zr, the main component specifically has a composition of $(Ba_{1-x-y}Ca_xSr_yO)_u(Ti_{1-z}Zr_z)_vO_2$.

Preferably, x satisfies $0 \leq x \leq 0.10$. More preferably, x satisfies $0 \leq x \leq 0.05$. Preferably, y satisfies $0 \leq y \leq 0.10$. More preferably, y satisfies $0 \leq y \leq 0.05$. Preferably, z satisfies $0 \leq z \leq 0.30$. More preferably, z satisfies $0 \leq z \leq 0.15$. Preferably, u/v satisfies $1.000 \leq u/v \leq 1.030$. More preferably, u/v satisfies $1.000 \leq u/v \leq 1.015$. When u/v falls within the above-mentioned range, sintering can proceed more sufficiently compared to when u/v exceeds the above-mentioned range. Thus, relative permittivity and reliability of the dielectric composition tend to be improved. When u/v falls within the above-mentioned range, sintering stability is not readily impaired compared to when u/v falls below the above-mentioned range. Thus, relative permittivity, reliability, and temperature characteristics of the multilayer ceramic capacitor 2 tend to be further improved.

The dielectric layers include "RE", "M", and silicon (Si) as a subcomponent. In addition, the subcomponent may include Fe, Al, and/or Zr.

As mentioned above, the subcomponent may be present by being solid-dissolved in the main phase grains. The subcomponent may be solid-dissolved in the main phase grains to constitute a shell part of a core-shell structure or may be completely solid-dissolved in the main phase grains to form complete solid-dissolved main phase grains. Moreover, the subcomponent may constitute segregation grains or may be present at grain boundaries between the main phase grains.

"RE" includes at least one selected from the group consisting of ytterbium (Yb), yttrium (Y), holmium (Ho), dysprosium (Dy), terbium (Tb), gadolinium (Gd), and europium (Eu). Preferably, "RE" includes Dy, Ho, Yb, and/or Y.

Dy, Tb, Gd, and Eu have relatively large ionic radii in the above-mentioned rare-earth elements, whereas Yb, Y, and Ho have relatively small ionic radii in the above-mentioned rare-earth elements. The larger the ionic radii of "RE", the more readily "RE" tends to solid-dissolve in the main phase grains.

When "RE" having relatively large ionic radii solid-dissolves in the main phase grains, "RE" tends to be substituted for mainly the A-site element of the main component. By contrast, when "RE" having relatively small ionic radii solid-dissolves in the main phase grains, "RE" tends to be substituted for mainly the B-site element of the main component.

The more "RE" having relatively large ionic radii solid-dissolves in the main phase grains, the longer tends to be the high-temperature load life. By contrast, the more "RE" having relatively small ionic radii solid-dissolves in the main phase grains, the larger tends to be the resistance.

"M" includes at least two selected from the group consisting of magnesium (Mg), manganese (Mn), vanadium (V), and chromium (Cr). "M" is included in the dielectric layers mainly as oxide of "M". "M" may be substituted for the B-site element of the main component.

The range of the composition of the main component of the main phase grains constituting the inner dielectric layers 10 and the range of the composition of the main component of the main phase grains constituting the outer dielectric layers 11 may be the same or may be different. The range of the composition of the subcomponent of the inner dielectric layers 10 excluding "RE" and the range of the composition of the subcomponent of the outer dielectric layers 11 excluding "RE" may be the same or may be different.

As shown in FIG. 1A, Tde denotes the distance between an outer surface 120 of an outermost layer of the internal electrode layers 12 and an outer surface 40 of the element body 4, i.e., an outer surface of one exterior region 15. Note that the outer surface 40 of the element body 4 is a plane perpendicular to the lamination direction. Although Tde is not limited, Tde is 10 µm or more and 500 µm or less.

Centers of the respective exterior regions 15 in the lamination direction are first regions 15a. The range of each first region 15a is not limited and can be, for example, a range having a distance of Tde×0.1 from a midpoint between the outer surface 120 of the outermost internal electrode layer 12 and the outer surface 40 of the element body 4 to the outer surface 120 of the outermost internal electrode layer 12 or a distance of Tde×0.1 from the midpoint to the outer surface 40 of the element body 4.

Outer regions inside the interior region 13 in the lamination direction are second regions 13b. That is, the second regions 13b are regions included in the interior region 13. The range of each second region 13b is not limited. For example, each second region 13b preferably extends from a first layer of the inner dielectric layers 10 to a fifth layer thereof. Note that, in the present embodiment, outermost layers of the inner dielectric layers 10 are counted as first layers, and layers are counted as second layers, third layers, etc. in sequence inwards in the lamination direction. Thus, while one of the outermost layers of the inner dielectric layers 10 in the lamination direction is counted as one first layer, the other one of the outermost layers of the inner dielectric layers 10 in the lamination direction is also counted as another first layer.

The internal electrode layers 12 are also included in the second regions 13b.

A center of the interior region 13 in the lamination direction is a third region 13c. The range of the third region 13c is not limited and can be, for example, a range having a distance of Tde×0.1 from a midpoint between one outer surface 40 of the element body 4 and the other outer surface 40 thereof facing the former outer surface 40 to the one outer surface 40 of the element body 4 or a distance of Tde×0.1 from the midpoint to the other outer surface 40 of the element body 4.

The internal electrode layers 12 are also included in the third region 13c.

An element having a highest mole ratio among "RE" in the inner dielectric layers 10 of the third region 13c is termed "RA", and an element having a highest mole ratio among "RE" in the first regions 15a is termed "RB".

"RA" and "RB" are different from each other.

An "RA" content of the first regions 15a in terms of $RA_2O_3$ with respect to 100 parts by mol of the main component in the first regions 15a is termed $D_{RAa}$. $D_{RAa}$ is preferably 1.0 part by mol or less.

An "RA" content of the inner dielectric layers 10 of the second regions 13b in terms of $RA_2O_3$ with respect to 100 parts by mol of the main component in the inner dielectric layers 10 of the second regions 13b is termed $D_{RAb}$. $D_{RAb}$ is preferably 0.4 parts by mol or more and 7.0 parts by mol or less.

An "RA" content of the inner dielectric layers 10 of the third region 13c in terms of $RA_2O_3$ with respect to 100 parts by mol of the main component in the inner dielectric layers 10 of the third region 13c is termed $D_{RAc}$. $D_{RAc}$ is preferably 0.4 parts by mol or more and 7.0 parts by mol or less.

An "RB" content of the first regions 15a in terms of $RB_2O_3$ with respect to 100 parts by mol of the main component in the first regions 15a is termed $D_{RBa}$. $D_{RBa}$ is preferably 0.4 parts by mol or more and 7.0 parts by mol or less.

An "RB" content of the inner dielectric layers 10 of the second regions 13b in terms of $RB_2O_3$ with respect to 100 parts by mol of the main component in the inner dielectric layers 10 of the second regions 13b is termed $D_{RBb}$. $D_{RBb}$ is preferably 1.0 part by mol or less.

An "RB" content of the inner dielectric layers 10 of the third region 13c in terms of $RB_2O_3$ with respect to 100 parts by mol of the main component in the inner dielectric layers 10 of the third region 13c is termed $D_{RBc}$. $D_{RBc}$ is preferably 1.0 part by mol or less.

$D_{RAa}$, $D_{RAb}$, and $D_{RAc}$ satisfy $D_{RAa} < D_{RAb} < D_{RAc}$.
$D_{RBa}$, $D_{RBb}$, and $D_{RBc}$ satisfy $D_{RBa} > D_{RBb} > D_{RBc}$.

That is, in the present embodiment, the concentrations of "RA" and "RB" gradually change from the exterior regions 15 to the interior region 13. Because the inner dielectric layers 10 are interposed between the internal electrode layers 12 in the interior region 13, the concentrations of "RA" and "RB" may not continuously change in the interior region 13. Thus, it can be said that the concentrations of "RA" and "RB" in the interior region 13 change intermittently or stepwise. However, when attention is drawn to only the inner dielectric layers 10 of the interior region 13, preferably, the concentrations of "RA" and "RB" continuously change.

An "RE" content of the first regions 15a in terms of $RE_2O_3$ in 100 parts by mass of the first regions 15a is termed $C_{REa}$. As mentioned earlier, in the present embodiment, "RE" includes at least one selected from the group consisting of Yb, Y, Ho, Dy, Tb, Gd, and Eu. Thus, "RE" may include both "RA" and "RB". $C_{REa}$ is preferably 0.4 parts by mass or more and 7.0 parts by mass or less.

An "RE" content of the inner dielectric layers 10 of the third region 13c in terms of $RE_2O_3$ in 100 parts by mass of the inner dielectric layers 10 of the third region 13c is termed $C_{REc}$. $C_{REc}$ is preferably 0.6 parts by mass or more and 10.0 parts by mass or less.

$C_{REa}$ and $C_{REc}$ preferably satisfy $C_{REc} > C_{REa}$, and a ratio of $C_{REc}$ to $C_{REa}$ ($C_{REc}/C_{REa}$) is preferably 1.1 or more and 3.0 or less.

$D_{RBa}$, which is the "RB" content of the first regions 15a in terms of $RB_2O_3$ with respect to 100 parts by mol of the main component in the first regions 15a, is preferably 0.7 parts by mol or more.

$D_{RAc}$, which is the "RA" content of the inner dielectric layers 10 of the third region 13c in terms of $RA_2O_3$ with respect to 100 parts by mol of the main component in the inner dielectric layers 10 of the third region 13c, is preferably 0.7 parts by mol or more.

$D_{RAc}$ and $D_{RAa}$ preferably satisfy $D_{RAc}/D_{RAa} \geq 3$.

Preferably, $r1 < r2 < r3 < r4 < r5$ and $r5/r1 > 2.0$ are satisfied, provided that $r_n$ (n=1 to 5) is a ratio ($D_{RAn}/D_{RBn}$) of $D_{RAn}$ to $D_{RBn}$ of an n-th layer (n is an integer) of the inner dielectric layers 10 in the lamination direction, where $D_{RAn}$ is an "RA" content of the n-th layer in terms of $RA_2O_3$ with respect to 100 parts by mol of the main component in the n-th layer and $D_{RBn}$ is an "RB" content of the n-th layer in terms of $RB_2O_3$ with respect to 100 parts by mol of the main component in the n-th layer.

<2. Method of Manufacturing Multilayer Ceramic Capacitor>

Now, a method of manufacturing the multilayer ceramic capacitor 2 shown in FIG. 1A is described below.

Similarly to a conventional multilayer ceramic capacitor, the multilayer ceramic capacitor 2 of the present embodiment is manufactured by forming a green chip with a normal printing or sheet method using pastes, firing the green chip, printing or transferring external electrodes onto the fired chip, and baking the chip again. Details of the manufacturing method are provided below.

Dielectric raw materials for the outer dielectric layers 11 are prepared and are turned into paint to give an outer-dielectric-layer paste.

As the dielectric raw materials, raw materials of $ABO_3$ (main component) and raw materials of other various oxides are prepared. Oxides, their mixture, or complex oxides of the above-mentioned components can be used as these raw materials. Additionally, the raw materials can be appropriately selected from various compounds (e.g., carbonate, oxalate, nitrate, hydroxide, and organic metal compounds) that become these oxides or complex oxides by firing, and the selected compounds can be mixed for use.

The particle size of a raw material powder of $ABO_3$ (main component) is not limited and is, for example, 150 to 300 nm.

In the present embodiment, using a mixture in which the oxides or the like of the above-mentioned components are evenly dispersed relative to the main component is preferable. However, dielectric raw materials in which the main component is covered by the above-mentioned components may be used. As raw materials other than those of the main component, for example, oxides of "RE", oxides of "M", or Si compounds may be used.

As the raw materials of $ABO_3$ (main component), those manufactured by a so-called solid phase method or by various liquid phase methods, such as an oxalate method, a hydrothermal synthesis method, an alkoxide method, and a sol-gel method, can be used.

When other components besides the above-mentioned components are included in the outer dielectric layers 11, oxides, their mixture, or complex oxides of the other components can be used as raw materials of the other components. Moreover, various compounds that become the oxides or complex oxides of the other components by firing can be used.

The amount of a compound that becomes "RB" after firing in terms of $RE_2O_3$ is larger than the amount of a compound that becomes "RE" excluding "RB" after firing in terms of $RE_2O_3$.

The amount of each compound of elements other than "RE" in the raw materials of the outer dielectric layers is determined so that the dielectric layers have the earlier mentioned composition after firing.

In terms of $BaCO_3$, a $BaCO_3$ powder may be included at 0.1 parts by mol or more and 2.0 parts by mol or less with respect to 100 parts by mol of the main component.

Among the raw materials of the other various oxides, any two or more may be mixed and calcined before being mixed with the main component. For example, the raw materials of oxides of "RE", raw materials of Si oxide, and raw materials of oxide of "A" included apart from the main component (e.g., raw material of Ba oxide) may be mixed and calcined in advance. The calcination temperature is less than 1100° C. Then, a compound powder resulting from calcination, the main component, and the uncalcined raw materials of the various oxides may be mixed. This brings a change of easiness for "RE" to solid-dissolve in the main phase grains.

The outer-dielectric-layer paste may be an organic paste in which the dielectric raw materials and an organic vehicle are kneaded or may be an aqueous paste.

The organic vehicle is a vehicle made from an organic solvent in which a binder is dissolved. The binder and the solvent are known ones.

When the outer-dielectric-layer paste is an aqueous paste, the dielectric raw materials and an aqueous vehicle in which a water-soluble binder, dispersant, or the like is dissolved in water are kneaded. Any water-soluble binder may be used. For example, polyvinyl alcohol, cellulose, or water-soluble acrylic resin is used.

Next, an inner-dielectric-layer paste for the inner side is prepared. The inner-dielectric-layer paste for the inner side can be produced similarly to the outer-dielectric-layer paste except that the amount of a compound that becomes "RA" after firing in terms of $RE_2O_3$ is larger than the amount of a compound that becomes "RE" excluding "RA" after firing in terms of $RE_2O_3$.

Next, an inner-dielectric-layer paste for the outer side is prepared. The inner-dielectric-layer paste for the outer side can be produced similarly to the outer-dielectric-layer paste except that the amount of the compound that becomes "RB" after firing in terms of $RE_2O_3$ is the same as or smaller than the amount of this compound included in the outer-dielectric-layer paste in terms of $RE_2O_3$ and that the amount of the compound that becomes "RA" after firing in terms of $RE_2O_3$ is the same as or smaller than the amount of this compound included in the inner-dielectric-layer paste for the inner side in terms of $RE_2O_3$. Note that the inner-dielectric-layer paste for the outer side may be the same as the outer-dielectric-layer paste or the inner-dielectric-layer paste for the inner side.

An internal-electrode-layer paste is produced by kneading a conductor made of Ni, Ni alloys, etc. mentioned above or various oxides, organic metal compounds, resinates, etc. that become Ni, Ni alloys, etc. mentioned above after firing with the above-mentioned organic vehicle. The internal-electrode-layer paste may include an inhibitor. Any inhibitor may be used. The inhibitor may have the same composition as the main component.

An external-electrode paste is produced using a conductor or the like made of Cu, Cu alloys, etc. mentioned above as an inorganic component, similarly to the internal-electrode-layer paste.

The organic vehicle content of each of the above pastes is not limited and is a normal content. For example, the binder accounts for about 1 to 15 mass %, and the solvent accounts for about 10 to 60 mass %. Each paste may include additives selected from, for example, various dispersants, plasticizers, dielectrics, and insulators as necessary. The total additive content of each paste may be 10 mass % or less.

Green sheets are formed using the outer-dielectric-layer paste on substrates (e.g., PET). The green sheets are peeled off from the substrates. The peeled green sheets are laminated and are pressed in the lamination direction to give an exterior-region green multilayer body. These outer-dielectric-layer green sheets may include one sheet or multiple sheets.

Then, green sheets are formed using the inner-dielectric-layer paste for the outer side on substrates, and internal electrode pattern layers are formed on the green sheets using the internal-electrode-layer paste. The green sheets are peeled off from the substrates to give inner-dielectric-layer green sheets for the outer side having the internal electrode pattern layers.

Then, green sheets are formed using the inner-dielectric-layer paste for the inner side on substrates, and internal electrode pattern layers are formed on the green sheets using the internal-electrode-layer paste. The green sheets are peeled off from the substrates to give inner-dielectric-layer green sheets for the inner side having the internal electrode pattern layers.

Any method of forming the internal electrode pattern layers may be used. The internal electrode pattern layers may be formed by a printing or transfer method or by thin film formation methods such as vapor deposition and sputtering.

Then, the inner-dielectric-layer green sheets for the outer side having the internal electrode pattern layers are laminated on the exterior-region green multilayer body. Then, the inner-dielectric-layer green sheets for the inner side having the internal electrode pattern layers are laminated on the inner-dielectric-layer green sheets for the outer side having the internal electrode pattern layers. Then, more inner-dielectric-layer green sheets for the outer side having the internal electrode pattern layers are laminated on the inner-dielectric-layer green sheets for the inner side having the internal electrode pattern layers. These green sheets are adhered by pressure as necessary to give an interior-region green multilayer body.

Then, green sheets are formed using the outer-dielectric-layer paste, are peeled off from the substrates, and are laminated on the interior-region green multilayer body. Pressure is applied in the lamination direction to give a green multilayer body of the element body 4. The outer-dielectric-layer green sheets may include one sheet or multiple sheets.

The green multilayer body of the element body 4 is cut into a predetermined shape and then peeled off from a substrate to give green chips.

The green chips are subject to a binder removal treatment before being fired. As for the binder removal conditions, the heating rate is preferably 5 to 300° C./hour; the binder removal temperature is preferably 180 to 900° C.; and the holding time is preferably 0.5 to 48 hours. The atmosphere of the binder removal treatment is air or a reducing atmosphere (e.g., a humidified $N_2$ gas or a humidified $N_2+H_2$ mixed gas).

After binder removal, the green chips are fired. For example, the heating rate may be 200 to 20000° C./hour; the firing temperature may be 1150 to 1350° C.; and the holding time may be 0.1 to 10 hours.

The atmosphere of firing is not limited and may be air or a reducing atmosphere. As an ambient gas for the reducing atmosphere, for example, a humidified mixed gas of $N_2$ and $H_2$ can be used. The oxygen partial pressure may be $1.0 \times 10^{-14}$ to $1.0 \times 10^{-9}$ MPa.

In the present embodiment, the element body 4 after being fired is preferably subject to an annealing treatment (oxidation treatment of the dielectric layers). Specifically, the annealing temperature may be 950 to 1100° C. The holding time may be 0.1 to 20 hours. The atmosphere of the oxidation treatment may be a humidified $N_2$ gas (oxygen partial pressure: $1.0 \times 10^{-9}$ to $1.0 \times 10^{-6}$ MPa).

In the binder removal treatment, firing, and annealing treatment described above, for example, a wetter is used to humidify the $N_2$ gas, mixed gas, etc. In such a case, the water temperature is preferably about 5 to 75° C.

The binder removal treatment, firing, and annealing treatment may be performed consecutively or independently.

The end surfaces of the element body 4 obtained as above are polished by, for example, barrel polishing or sandblasting. The external-electrode paste is applied to this element body and baked to form the external electrodes 6. As necessary, a coating layer is then formed on surfaces of the external electrodes 6 by plating or so.

The multilayer ceramic capacitor 2 of the present embodiment manufactured in such a manner is mounted on a printed circuit board or the like by soldering or so and is used in various electronics.

In a conventional multilayer ceramic capacitor, its exterior regions tend to readily have pores compared to its interior region. It is assumed that this is because sintering tends not to readily proceed in the exterior regions, for the exterior regions do not include internal electrode layers having high thermal conductivity whereas the interior region includes such internal electrode layers.

By contrast, the inner dielectric layers and the outer dielectric layers of the multilayer ceramic capacitor 2 according to the present embodiment have the compositions, particularly "RE" and its content, satisfying the conditions described above, enabling the exterior regions 15 to be sufficiently fired to have a reduced porosity for densification, which can result in improvement of moisture resistance.

Also, in the multilayer ceramic capacitor 2 according to the present embodiment, the concentrations of "RA" and "RB" gradually change from the exterior regions 15 to the interior region 13 so that both $D_{RAa}<D_{RAb}<D_{RAc}$ and $D_{RBa}>D_{RBb}>D_{RBc}$ are satisfied. This causes a gradual change in the sintering behavior from the exterior regions 15 to the interior region 13, enabling reduction of difference between stress in the exterior regions 15 and stress in the interior region 13, which can result in reduction of electrostrictive cracks.

Although the description of the embodiment of the present invention is provided above, the present invention is not at all limited to the above embodiment. The present invention may be put into practice in various forms without departing from the scope of the invention.

For example, although the above description states that the inner-dielectric-layer paste for the inner side and the inner-dielectric-layer paste for the outer side differ in the "RA" content, the inner-dielectric-layer paste for the inner side and the inner-dielectric-layer paste for the outer side may have the same "RA" content.

Also, "RA" or "RB" may be partly substituted for an inorganic component of the internal-electrode-layer paste. When not too much component of "RA" or "RB" is included in the internal-electrode-layer paste, the "RA" content and the "RB" content of the inner dielectric layers 10 of the interior region 13 can be controlled, which can make it easy to satisfy $D_{RAa}<D_{RAb}<D_{RAc}$ and $D_{RBa}>D_{RBb}>D_{RBc}$.

Modified Example

While the multilayer ceramic capacitor exemplifies the multilayer electronic device according to the present invention in the above embodiment, the multilayer electronic device according to the present invention is not limited to the multilayer ceramic capacitor and is any multilayer electronic device having the structure described above.

EXAMPLES

Hereinafter, the present invention is described in further detail with Examples and Comparative Examples. However, the present invention is not limited to Examples described below.

<Experiment 1>

Experiment 1 relates to Examples and Comparative Examples shown in Tables 1A and 1B.

(Manufacturing Method 1)

A manufacturing method 1 relates to Comparative Example 1, Examples 1 to 4, and Examples 6 and 7.

An outer-dielectric-layer paste was prepared as follows.

As a raw material powder of the main component, a $BaTiO_3$ powder was prepared. The $BaTiO_3$ powder had a Ba/Ti ratio of 1.000.

Raw material powders of oxides of "RE" shown in Table 1A were prepared.

As raw material powders of oxides of "M", a MgO powder, a $MnCO_3$ powder, and a $V_2O_5$ powder were prepared. Note that $MnCO_3$ was to be included in dielectric layers as MnO after firing.

As a raw material powder of Si oxide, a $SiO_2$ powder was prepared.

As a raw material powder of Ba oxide, a $BaCO_3$ powder was prepared. Note that $BaCO_3$ was to be included in the dielectric layers as BaO after firing.

Then, the raw material powders prepared as above were weighed so that the $SiO_2$ powder was 1.0 part by mol, the $BaCO_3$ powder was 1.0 part by mol, and a mixture of the MgO powder, $MnCO_3$ powder, and $V_2O_5$ powder was 0.7 parts by mol in terms of the oxides with respect to 100 parts by mol of the main component. Also, the raw material powders of "RE" were weighed so that they were as shown in Table 1A in terms of the oxides with respect to 100 parts by mol of the main component. The weighed raw material powders were wet-mixed and pulverized with a ball mill for 20 hours and dried to give a dielectric raw material.

Then, polyvinyl butyral resin (10 parts by mass), dioctyl phthalate (DOP) as a plasticizer (5 parts by mass), and alcohol as a solvent (100 parts by mass) were mixed with 100 parts by mass of the dielectric raw material using a ball mill. The mixture was turned into a paste to give the outer-dielectric-layer paste.

An inner-dielectric-layer paste for the outer side and an inner-dielectric-layer paste for the inner side were produced similarly to the outer-dielectric-layer paste except that the raw material powders of oxides of "RE" and their contents in the pastes were as shown in Table 1A.

A Ni powder, terpineol, ethyl cellulose, and benzotriazole were prepared so that the mass ratio was 44.6:52.0:3.0:0.4. They were kneaded using a three-roller mill and turned into a paste to give an internal-electrode-layer paste.

Outer-dielectric-layer green sheets were formed using the outer-dielectric-layer paste produced as above on PET films so as to have a thickness of 6.0 μm each after being dried and were pressed in the lamination direction to give an exterior-region green multilayer body.

Then, green sheets were formed using the inner-dielectric-layer paste for the outer side produced as above so as to have a thickness of 4.0 μm each after being dried, and electrode layers were printed on the green sheets in predetermined patterns using the internal-electrode-layer paste. Then, the green sheets were peeled off from PET films to give inner-dielectric-layer green sheets for the outer side having the internal electrode pattern layers.

Also, green sheets were formed using the inner-dielectric-layer paste for the inner side produced as above so as to have a thickness of 4.0 μm each after being dried, and electrode layers were printed on the green sheets in predetermined patterns using the internal-electrode-layer paste. Then, the green sheets were peeled off from PET films to give inner-dielectric-layer green sheets for the inner side having the internal electrode pattern layers.

Five inner-dielectric-layer green sheets for the outer side were laminated on the exterior-region green multilayer body. Twenty inner-dielectric-layer green sheets for the inner side were laminated on the five inner-dielectric-layer green sheets for the outer side. Another five inner-dielectric-layer green sheets for the outer side were laminated on the twenty inner-dielectric-layer green sheets for the inner side. These green sheets were adhered by pressure to give a multilayer body.

More outer-dielectric-layer green sheets were formed using the outer-dielectric-layer paste on the multilayer body and were pressed in the lamination direction to give a green multilayer body of an element body 4. The green multilayer body was cut into a predetermined size to give green chips.

The green chips were subject to a binder removal treatment, firing, and an oxidation treatment to give element bodies (sintered bodies).

As for the binder removal conditions, the heating rate was 25° C./hour; the binder removal temperature was 235° C.; the holding time was 8 hours; and the atmosphere was air.

As for the firing conditions, the heating rate was 200° C./hour; the holding temperature was 1280° C.; the holding time was 2 hours; and the cooling rate was 200° C./hour. The ambient atmosphere was a humidified $N_2+H_2$ mixed gas. The oxygen partial pressure was about $5.0 \times 10^{-11}$ MPa.

As for the oxidation treatment conditions, the heating rate and the cooling rate were 200° C./hour; the oxidation treatment temperature was 1050° C.; the holding time was 3 hours; the ambient atmosphere was a humidified $N_2$ gas; and the oxygen partial pressure was $1.0 \times 10^{-7}$ MPa.

A wetter was used for humidifying the respective ambient gases used for firing and the oxidation treatment.

End surfaces of each element body were polished by barrel polishing. Then, a Cu paste was applied as external electrodes, and a baking treatment was performed in a reducing atmosphere, to give a multilayer ceramic capacitor sample shown in FIG. 1A. The capacitor sample had a size of 3.2 mm×1.6 mm×0.7 mm. The inner dielectric layers had a thickness of 3.0 μm. The internal electrode layers had a thickness of 1.0 μm. The exterior regions had a thickness (Tde) of 270 μm. The number of the inner dielectric layers was 40.

(Manufacturing Method 2)

A manufacturing method 2 relates to Comparative Example 2 and Examples 5 and 8.

In Comparative Example 2 for which the manufacturing method 2 was used, an internal-electrode-layer paste was produced as in Example 2 except that the Ni powder, an $RB_2O_3$ powder, terpineol, ethyl cellulose, and benzotriazole were prepared to satisfy a mass ratio of 42.4:2.2:52.0:3.0:0.4 for manufacturing a multilayer ceramic capacitor sample.

In Examples 5 and 8 for which the manufacturing method 2 was used, an internal-electrode-layer paste was produced as in Example 2 except that the Ni powder, an $RA_2O_3$ powder, terpineol, ethyl cellulose, and benzotriazole were prepared to satisfy a mass ratio of 42.4:2.2:52.0:3.0:0.4 for manufacturing a multilayer ceramic capacitor sample.

(Manufacturing Method 3)

A manufacturing method 3 relates to Comparative Example 3.

When the manufacturing method 3 was used, a multilayer ceramic capacitor sample was manufactured as in Comparative Example 1 except that an outer-dielectric-layer paste, an inner-dielectric-layer paste for the outer side, and an inner-dielectric-layer paste for the inner side were produced as follows.

When the manufacturing method 3 was used, the outer-dielectric-layer paste was produced similarly to that of Comparative Example 1 except that the MgO powder content of the outer-dielectric-layer paste was three times that of Comparative Example 1 and that the $MnCO_3$ powder content and the $V_2O_5$ powder content of the outer-dielectric-layer paste were reduced, so that the mixture of the MgO powder, $MnCO_3$ powder, and $V_2O_5$ powder in terms of the oxides weighed 1.0 part by mol with respect to 100 parts by mol of the main component.

When the manufacturing method 3 was used, the inner-dielectric-layer paste for the outer side was produced similarly to that of Comparative Example 1 except that the $MnCO_3$ powder content of the inner-dielectric-layer paste for the outer side was three times that of Comparative Example 1 and that the MgO powder content and the $V_2O_5$ powder content of the inner-dielectric-layer paste for the outer side were reduced, so that the mixture of the MgO powder, $MnCO_3$ powder, and $V_2O_5$ powder in terms of the oxides weighed 1.0 part by mol with respect to 100 parts by mol of the main component.

When the manufacturing method 3 was used, the inner-dielectric-layer paste for the outer side was used as the inner-dielectric-layer paste for the inner side.

(Method of Calculating $D_{RAa}$, $D_{RBa}$, $D_{RAb}$, $D_{RBb}$, $D_{RAc}$, and $D_{RBc}$)

The element body 4 was cut along its lamination direction, and the resulting section was polished to give a polished surface. Then, the polished surface was thinned using focused ion beam (FIB). The thinned sample for measurement was subject to mapping analysis using a scanning transmission electron microscope (STEM) having an energy-dispersive X-ray spectroscopy (EDS) device attached. Hereinafter, the STEM having the EDS device attached is referred to as STEM-EDS. A measurement range was determined so that one field of view in the first regions had an area of 50 μm², and a mapping image was obtained.

The mapping image obtained using STEM-EDS was divided into 0.027 μm/pixel dots, and the contrast intensity of each "RE" in each dot was quantified. Specifically, the contrast intensities were classified into 91 stages from 0 to 90, the lowest (no detection) being 0 and the highest being 90. The average contrast intensities of the field of view were calculated.

Three sintered bodies having different "RE" concentrations with respect to the main phase grains (main component) were prepared, and their contrast intensities were calculated, based on which calibration curves were made. Based on the calibration curves, $D_{RAa}$ and $D_{RBa}$ of the first regions were calculated.

$D_{RAb}$ and $D_{RBb}$ of the second regions were calculated as $D_{RAa}$ and $D_{RBa}$ of the first regions were calculated, except that the measurement range was changed from the first regions to the second regions. Likewise, $D_{RAc}$ and $D_{RBc}$ of the third region were calculated as $D_{RAa}$ and $D_{RBa}$ of the first regions were calculated, except that the measurement range was changed from the first regions to the third region.

Note that, when $D_{RAb}$ and $D_{RBb}$ of the second regions and DRAG and $D_{RBc}$ of the third region were calculated, the average contrast intensities of portions not including the internal electrode layers in the measurement ranges, i.e., the average contrast intensities of the inner dielectric layers in the measurement ranges, were calculated.

In Tables 1B, 2B, 3B, and 4B, "OK" of the "$D_{RAa}<D_{RAb}<D_{RAc}$" column indicates that $D_{RAa}<D_{RAb}<D_{RAc}$ was satisfied, and "NG" (not good) thereof indicates that $D_{RAa}<D_{RAb}<D_{RAc}$ was not satisfied.

In Tables 1B, 2B, 3B, and 4B, "OK" of the "$D_{RBa}>D_{RBb}>D_{RBc}$" column indicates that $D_{RBa}>D_{RBb}>D_{RBc}$ was satisfied, and "NG" thereof indicates that $D_{RBa}>D_{RBb}>D_{RBc}$ was not satisfied.

In Examples 2, 6, and 7, $D_{RAc}/D_{RAa}$ was calculated. Table 3B shows the results.

(Method of Calculating $D_{RBa}$ and $D_{RAc}$)

Table 3B shows $D_{RBa}$ and $D_{RAc}$, measured as above, of Examples 2, 6, and 7.

In Examples 1, 2, and 8, $D_{RAn}$ and $D_{RBn}$ were calculated as $D_{RAa}$ and others were calculated, and $r_n$ ($D_{RAn}/D_{RBn}$) (n=1 to 5) was calculated. That is, r1 to r5 were calculated.

In Table 4B, "OK" of the "r1<r2<r3<r4<r5 and r5/r1>2.0" column indicates that both r1<r2<r3<r4<r5 and r5/r1>2.0 were satisfied, and "NG" thereof indicates that not both r1<r2<r3<r4<r5 and r5/r1>2.0 were satisfied.

(Evaluation of $C_{REc}>C_{REa}$)

In Examples 1, 4, and 5, whether $C_{REc}>C_{REa}$ was satisfied was checked. The element body 4 was cut along its lamination direction, and the resulting section was polished to give a polished surface. The first regions and the third region of the resulting section was subject to laser ablation inductively coupled plasma (LA-ICP) measurement, and each rare-earth element content (parts by mass) of the entire dielectric region (100 parts by mass) was calculated in terms of $RE_2O_3$. Then, all rare-earth element contents were added up to calculate $C_{REa}$ and $C_{REc}$. Note that, when $C_{REc}$ was calculated, calculation was affected by the internal electrode layers. Based on the measurement results of "RE" of the third region of the multilayer ceramic capacitor sample of Comparative Example 1, in which only one rare-earth element was included, a correction value was determined, and $C_{REc}$ of Example 1, $C_{REc}$ of Example 4, and $C_{REc}$ of Example 5 were calculated.

In Table 2B, "OK" of the "$C_{REc}>C_{REa}$" column indicates that $C_{REc}>C_{REa}$ was satisfied, and "NG" thereof indicates that $C_{REc}>C_{REa}$ was not satisfied.

(Withstand Voltage Rating)

A DC voltage was applied to the multilayer ceramic capacitor sample, and a voltage at which a short circuit occurred when the applied voltage was increased was deemed to be the breakdown voltage (VB) (withstand voltage). Samples were rated as "NG" when the VB was less than 150, "B" when the VB was 150 V or more and less than 200 V, or "A" when the VB was 200 V or more. It can be determined that the higher the VB, the higher the efficiency of reducing electrostrictive cracks. Tables 1C, 2C, 3C, and 4C show the results.

(Pressure Cooker Bias Test (PCBT))

Under an environment at 125° C. and a humidity of 95%, a voltage of 20 V/μm was applied to two hundred samples, and their insulation resistances (IRs) were measured after 50 hours and after 100 hours. Samples whose IRs dropped from those before the test by one digit or more were deemed failures. Samples were rated as "NG" when the failures occurred in less than 50 hours, "B" when the failures occurred in 50 hours or more and less than 100 hours, or "A" when the failures did not occur in 100 hours. Tables 1C, 2C, 3C, and 4C show the results.

(Overall Determination)

The multilayer ceramic capacitor samples (Comparative Examples) for which at least one of withstand voltage and PCBT was rated as "NG" were rated as "NG".

The multilayer ceramic capacitor samples (Examples) for which the withstand voltage was rated as "B" and PCBT was rated as "B" were rated as "A".

The multilayer ceramic capacitor samples (Examples) for which the withstand voltage was rated as "B" and PCBT was rated as "A" were rated as "AA".

The multilayer ceramic capacitor samples (Examples) for which both the withstand voltage and PCBT were rated as "A" were rated as "AAA".

Tables 1C, 2C, 3C, and 4C show the results of overall determination.

TABLE 1A

|  | "RE" raw material powder content of outer-dielectric-layer paste | "RE" raw material powder content of inner-dielectric-layer paste for outer side | "RE" raw material powder content of inner-dielectric-layer paste for inner side |
|---|---|---|---|
| Comparative Example 1 | $Dy_2O_3$: 4.0 parts by mol | $Dy_2O_3$: 4.0 parts by mol | $Dy_2O_3$: 4.0 parts by mol |
| Example 1 | $Ho_2O_3$: 4.0 parts by mol | $Dy_2O_3$: 2.0 parts by mol, $Ho_2O_3$: 2.0 parts by mol | $Dy_2O_3$: 4.0 parts by mol |
| Example 2 | $Y_2O_3$: 1.5 parts by mol, $Dy_2O_3$: 0.38 parts by mol | $Dy_2O_3$: 1.5 parts by mol, $Y_2O_3$: 0.38 parts by mol | $Dy_2O_3$: 1.5 parts by mol, $Y_2O_3$: 0.38 parts by mol |
| Example 3 | $Y_2O_3$: 1.5 parts by mol | $Dy_2O_3$: 1.5 parts by mol | $Dy_2O_3$: 1.5 parts by mol |
| Comparative Example 2 | $Y_2O_3$: 1.5 parts by mol, $Dy_2O_3$: 0.38 parts by mol | $Dy_2O_3$: 1.5 parts by mol, $Y_2O_3$: 0.38 parts by mol | $Dy_2O_3$: 1.5 parts by mol, $Y_2O_3$: 0.38 parts by mol |
| Comparative Example 3 | $Dy_2O_3$: 4.0 parts by mol | $Dy_2O_3$: 4.0 parts by mol | $Dy_2O_3$: 4.0 parts by mol |

TABLE 1B

|  | "RA" element | "RB" element | $D_{RBa} > D_{RBb} > D_{RBc}$ | $D_{RAa} < D_{RAb} < D_{RAc}$ |
|---|---|---|---|---|
| Comparative Example 1 | Dy | Dy | NG | NG |
| Example 1 | Dy | Ho | OK | OK |
| Example 2 | Dy | Y | OK | OK |
| Example 3 | Dy | Y | OK | OK |
| Comparative Example 2 | Dy | Y | NG | OK |
| Comparative Example 3 | Dy | Dy | NG | NG |

TABLE 1C

|  | Withstand voltage rating | PCBT rating | Overall determination | Manufacturing method |
|---|---|---|---|---|
| Comparative Example 1 | NG | A | NG | (1) |
| Example 1 | B | B | A | (1) |
| Example 2 | A | A | AAA | (1) |
| Example 3 | A | A | AAA | (1) |
| Comparative Example 2 | NG | NG | NG | (2) |
| Comparative Example 3 | NG | NG | NG | (3) |

TABLE 2A

|  | "RE" raw material powder content of outer-dielectric-layer paste | "RE" raw material powder content of inner-dielectric-layer paste for outer side | "RE" raw material powder content of inner-dielectric-layer paste for inner side |
|---|---|---|---|
| Example 1 | $Ho_2O_3$: 3.0 parts by mol | $Dy_2O_3$: 1.5 parts by mol, $Ho_2O_3$: 1.5 parts by mol | $Dy_2O_3$: 3.0 parts by mol |
| Example 4 | $Y_2O_3$: 2.4 parts by mol, $Dy_2O_3$: 0.6 parts by mol | $Dy_2O_3$: 2.4 parts by mol, $Y_2O_3$: 0.6 parts by mol | $Dy_2O_3$: 2.4 parts by mol, $Y_2O_3$: 0.6 parts by mol |
| Example 5 | $Ho_2O_3$: 2.4 parts by mol, $Gd_2O_3$: 0.6 parts by mol | $Gd_2O_3$: 2.8 parts by mol, $Ho_2O_3$: 0.7 parts by mol | $Gd_2O_3$: 2.8 parts by mol, $Ho_2O_3$: 0.7 parts by mol |

TABLE 2B

|  | "RA" element | "RB" element | $D_{RBa} > D_{RBb} > D_{RBc}$ | $D_{RAa} < D_{RAb} < D_{RAc}$ | $C_{REc} > C_{REa}$ |
|---|---|---|---|---|---|
| Example 1 | Dy | Ho | OK | OK | NG |
| Example 4 | Dy | Y | OK | OK | OK |
| Example 5 | Gd | Ho | OK | OK | OK |

TABLE 2C

|  | Withstand voltage rating | PCBT rating | Overall determination | Manufacturing method |
|---|---|---|---|---|
| Example 1 | B | B | A | (1) |
| Example 4 | B | A | AA | (1) |
| Example 5 | B | A | AA | (2) |

TABLE 3A

|  | "RE" raw material powder content of outer-dielectric-layer paste | "RE" raw material powder content of inner-dielectric-layer paste for outer side | "RE" raw material powder content of inner-dielectric-layer paste for inner side |
|---|---|---|---|
| Example 2 | $Y_2O_3$: 1.5 parts by mol, $Dy_2O_3$: 0.38 parts by mol | $Dy_2O_3$: 1.5 parts by mol, $Y_2O_3$: 0.38 parts by mol | $Dy_2O_3$: 1.5 parts by mol, $Y_2O_3$: 0.38 parts by mol |
| Example 6 | $Ho_2O_3$: 0.6 parts by mol, $Dy_2O_3$: 0.18 parts by mol | $Dy_2O_3$: 0.6 parts by mol, $Ho_2O_3$: 0.18 parts by mol | $Dy_2O_3$: 0.6 parts by mol, $Ho_2O_3$: 0.18 parts by mol |
| Example 7 | $Y_2O_3$: 1.3 parts by mol, $Dy_2O_3$: 0.6 parts by mol | $Dy_2O_3$: 1.3 parts by mol, $Y_2O_3$: 0.6 parts by mol | $Dy_2O_3$: 1.3 parts by mol, $Y_2O_3$: 0.6 parts by mol |

TABLE 3B

|  | "RA" element | "RB" element | $D_{RBa} > D_{RBb} > D_{RBc}$ | $D_{RAa} < D_{RAb} < D_{RAc}$ | $D_{RAc}$ (parts by mol) | $D_{RBa}$ (parts by mol) | $D_{RAc}/D_{RAa}$ |
|---|---|---|---|---|---|---|---|
| Example 2 | Dy | Y | OK | OK | 1.5 | 1.5 | 3.9 |
| Example 6 | Dy | Ho | OK | OK | 0.6 | 0.6 | 3.2 |
| Example 7 | Dy | Y | OK | OK | 1.6 | 1.7 | 2.5 |

TABLE 3C

| | Withstand voltage rating | PCBT rating | Overall determination | Manufacturing method |
|---|---|---|---|---|
| Example 2 | A | A | AAA | (1) |
| Example 6 | B | B | A | (1) |
| Example 7 | B | B | A | (1) |

TABLE 4A

| | "RE" raw material powder content of outer-dielectric-layer paste | "RE" raw material powder content of inner-dielectric-layer paste for outer side | "RE" raw material powder content of inner-dielectric-layer paste for inner side |
|---|---|---|---|
| Example 1 | Ho$_2$O$_3$: 4.0 parts by mol | Dy$_2$O$_3$: 2.0 parts by mol, Ho$_2$O$_3$: 2.0 parts by mol | Dy$_2$O$_3$: 4.0 parts by mol |
| Example 2 | Y$_2$O$_3$: 1.5 parts by mol, Dy$_2$O$_3$: 0.38 parts by mol | Dy$_2$O$_3$: 1.5 parts by mol, Y$_2$O$_3$: 0.38 parts by mol | Dy$_2$O$_3$: 1.5 parts by mol, Y$_2$O$_3$: 0.38 parts by mol |
| Example 8 | Yb$_2$O$_3$: 4.0 parts by mol, Ho$_2$O$_3$: 1.0 part by mol | Ho$_2$O$_3$: 4.0 parts by mol, Yb$_2$O$_3$: 1.0 part by mol | Ho$_2$O$_3$: 4.0 parts by mol, Yb$_2$O$_3$: 1.0 part by mol |

TABLE 4B

| | "RA" element | "RB" element | $D_{RBa} > D_{RBb} > D_{RBc}$ | $D_{RAa} < D_{RAb} < D_{RAc}$ | r1 < r2 < r3 < r4 < r5 and r5/r1 > 2.0 |
|---|---|---|---|---|---|
| Example 1 | Dy | Ho | OK | OK | NG |
| Example 2 | Dy | Y | OK | OK | OK |
| Example 8 | Ho | Yb | OK | OK | OK |

TABLE 4C

| | Withstand voltage rating | PCBT rating | Overall determination | Manufacturing method |
|---|---|---|---|---|
| Example 1 | B | B | A | (1) |
| Example 2 | A | A | AAA | (1) |
| Example 8 | A | A | AAA | (2) |

According to Tables 1B and 1C, it was confirmed that, when "RA" and "RB" were different from each other, $D_{RAa} < D_{RAb} < D_{RAc}$ was satisfied, and $D_{RBa} > D_{RBb} > D_{RBc}$ was satisfied (Examples 1 to 3), the withstand voltage rating and the PCBT rating were good.

Note that, FIGS. 2A, 2B, 3A, and 3B relate to Example 3.

Figure 2A:
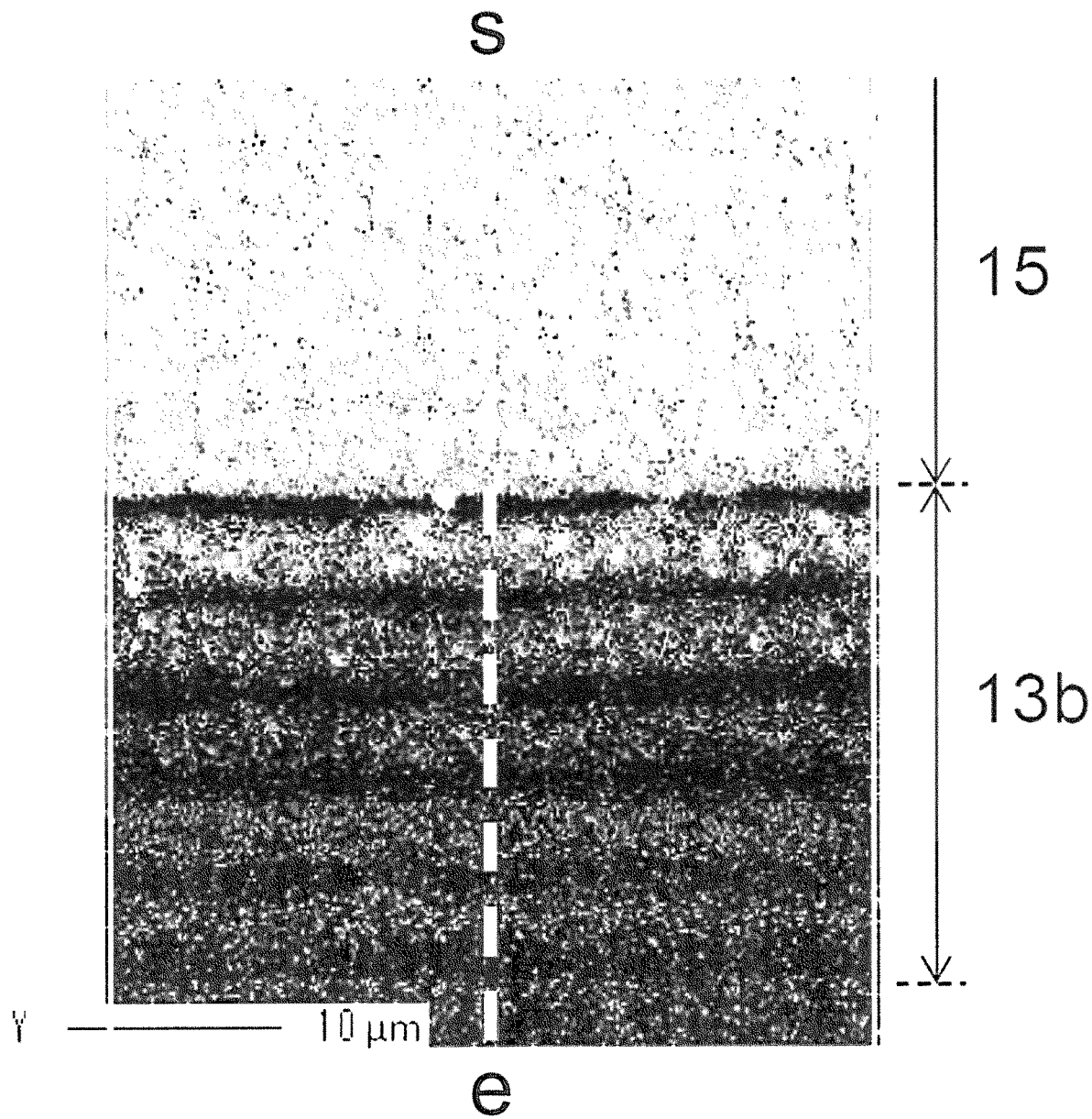
FIG. 2A is an Y mapping image of Example 3.

Specifically, FIG. 2A is an Y mapping image of a field of view including one exterior region 15 and one second region 13b, obtained using STEM-EDS. FIG. 2B shows changes in the contrast intensity from point s to point e of FIG. 2A. In FIG. 2B, the x-axis shows the contrast intensity, and the y-axis shows the distance from point s. The unit of the y-axis is μm.

Figure 3A:
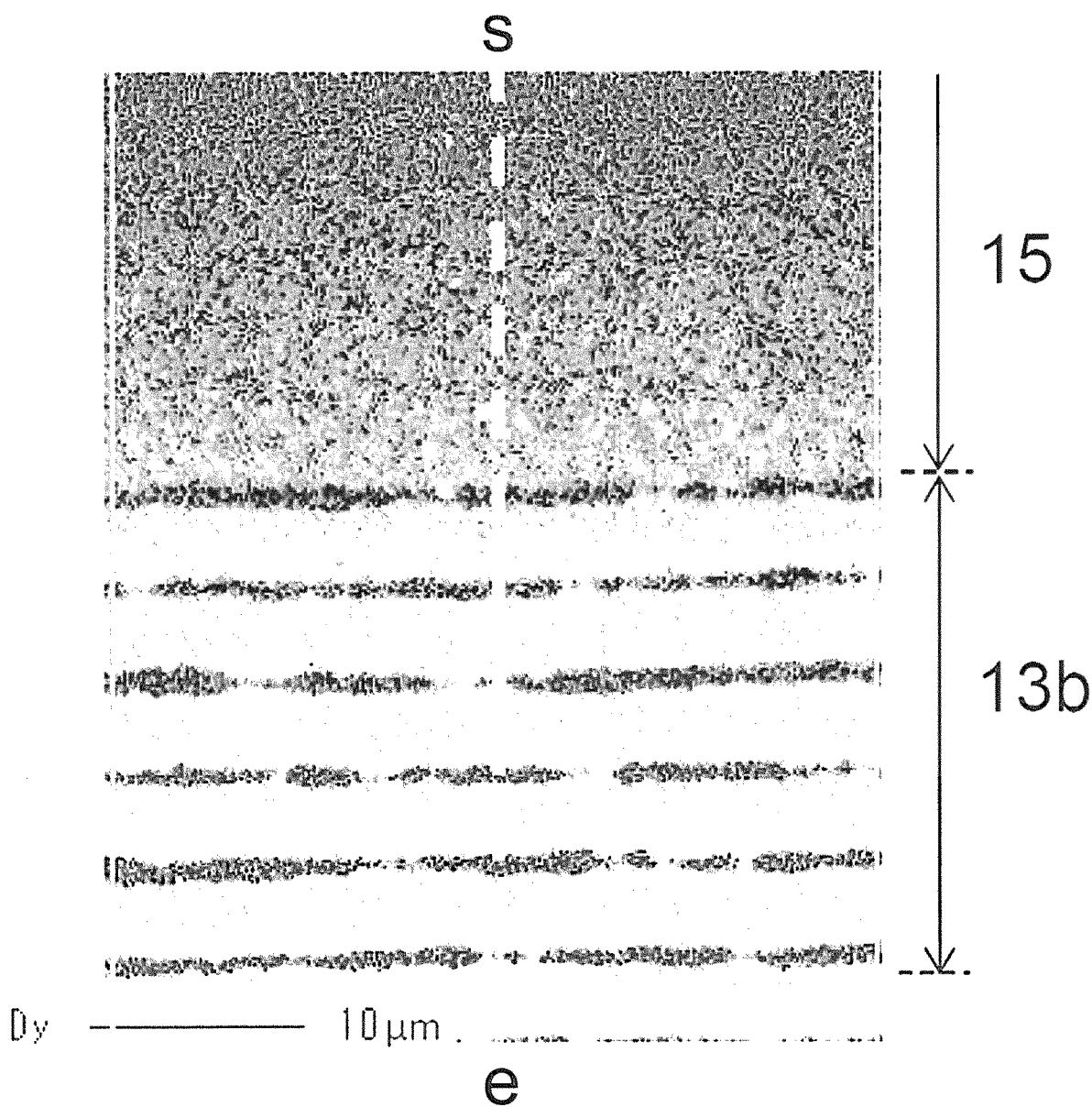
FIG. 3A is a Dy mapping image of Example 3.
Figure 3B:
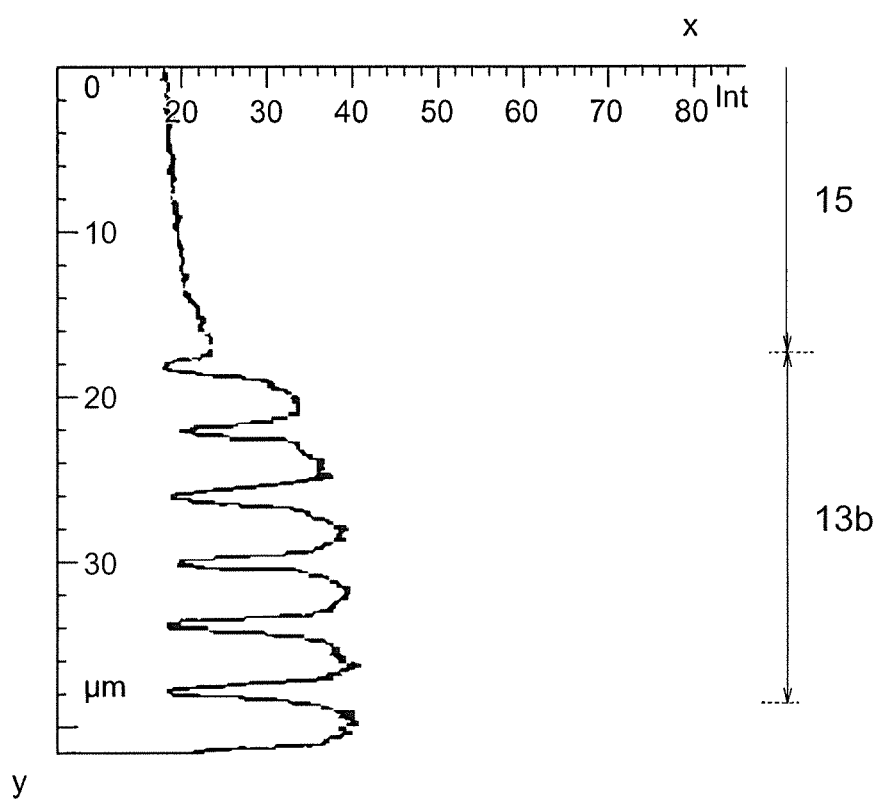
FIG. 3B is a graph showing changes in the Dy content of FIG. 3A.

FIG. 3A is a Dy mapping image of the same field of view as FIG. 2A, obtained using STEM-EDS. FIG. 3B shows changes in the contrast intensity from point s to point e of FIG. 3A. In FIG. 3B, the x-axis shows the contrast intensity, and the y-axis shows the distance from point s. The unit of the y-axis is μm.

According to FIGS. 2A, 2B, 3A, and 3B, it was confirmed that, in Example 3, the concentrations of "RA" (Dy) and "RB" (Y) gradually changed from the exterior region 15 to the interior region 13 so that both $D_{RAa} < D_{RAb} < D_{RAc}$ and $D_{RBa} > D_{RBb} > D_{RBc}$ were satisfied. More specifically, it was confirmed that, in Example 3, the concentrations of "RA" (Dy) and "RB" (Y) gradually changed intermittently from the exterior region 15 to the interior region 13 over the internal electrode layers 12 so that both $D_{RAa} < D_{RAb} < D_{RAc}$ and $D_{RBa} > D_{RBb} > D_{RBc}$ were satisfied. It is assumed that, in Example 3, this caused a gradual change in the sintering behavior from the exterior region 15 to the interior region 13, enabling reduction of difference between stress in the exterior region 15 and stress in the interior region 13, which resulted in a good withstand voltage rating, i.e., reduction of electrostrictive cracks.

In Comparative Example 1, the element included as "RA" and the element included as "RB" were both Dy. It is assumed that, in Comparative Example 1, this resulted in no concentration gradient of "RA" or "RB" from the exterior regions to the interior region, not allowing for reduction of difference in the sintering behavior between the exterior regions and the interior region, which caused stress residue inside the chip to lead to "NG" rating of the withstand voltage.

It is assumed that, in Comparative Example 2, $D_{RBa} > D_{RBb} > D_{RBc}$ was not satisfied because the RB$_2$O$_3$ powder content of the internal-electrode-layer paste was too high. It is assumed that, in Comparative Example 2, because the "RB" content of the interior region was higher than that of the exterior regions, sintering of the interior region did not proceed, which led to "NG" rating of both the withstand voltage and PCBT.

In Comparative Example 3, the element included as "RA" and the element included as "RB" were the same; an "M" element included in the outer dielectric layers at the highest ratio was Mg; and an "M" element included in the inner dielectric layers at the highest ratio was Mn. It was confirmed that, in Comparative Example 3, this caused concentration gradients of Mg and Mn from the exterior regions to the interior region. Nevertheless, it was confirmed that, because the overall determination for Comparative Example 3 was "NG", "RA" and "RB" of "RE" were each required to have a predetermined distribution. Reasons may be as follows. Elements other than "RE" tend to make a big difference in sinterability of the main phase grains or the amount of the elements that solid-dissolve in the main phase grains. By contrast, although the degree to which "RE" solid-dissolves in the main phase grains slightly depends on the ionic radii of "RE", the difference made by the ionic radii is smaller than the difference made by the elements other than "RE". Thus, because predetermined concentration gradients of "RA" and "RB" from the exterior regions to the interior region readily lead to gradual changes in the sintering behavior, the difference between stress in the exterior regions and stress in the interior region is reduced to readily reduce electrostrictive cracks, and pores in the exterior regions are reduced for densification to readily improve moisture resistance.

According to Tables 2B and 2C, it was confirmed that, when $C_{REc} > C_{REa}$ was satisfied (Examples 4 and 5), the PCBT ratings were better compared to when $C_{REc} > C_{REa}$ was not satisfied (Example 1).

In Examples 4 and 5, $C_{REc} > C_{REa}$ was satisfied. In Examples 4 and 5, the proportion by weight of the subcomponent relative to the main phase grains was lower in the exterior regions than in the interior region. It was confirmed that this caused sintering of the main phase grains to more readily proceed compared to Example 1 to prevent or reduce generation of pores in the exterior regions. It is assumed that, because moisture did not readily enter the element body under high humidity in Examples 4 and 5 compared to Example 1, the PCBT ratings of Examples 4 and 5 were better than that of Example 1.

According to Tables 3B and 3C, it was confirmed that, when $D_{RBa}$ was 0.7 parts by mol or more and $D_{RAc}$ was 0.7 parts by mol or more (Example 2), the withstand voltage rating and the PCBT rating were better compared to when $D_{RBa}$ was 0.6 parts by mol and $D_{RAc}$ was 0.6 parts by mol (Example 6).

In Example 2, $D_{RBa}$ and $D_{RAc}$ were 0.7 parts by mol or more. It was confirmed that this caused the rare-earth elements to be sufficiently solid-dissolved in many main phase grains in Example 2. Regions where the rare-earth elements were solid-dissolved in the main phase grains had an effect of preventing or reducing migration of oxygen defects generated at a high temperature and a high voltage. It is assumed that, due to this effect, the PCBT rating was better in Example 2 compared to when $D_{RBa}$ and $D_{RAc}$ were 0.7 parts by mol or less (Example 6).

According to Tables 3B and 3C, it was confirmed that, when $D_{RAc}/D_{RAa} \geq 3$ was satisfied (Example 2), the withstand voltage rating and the PCBT rating were better compared to when $D_{RAc}/D_{RAa}$ was less than 3.0 (Example 7).

In Example 2, $D_{RAc}/D_{RAa} \geq 3$ was satisfied. Although pores tended to be more readily generated in the exterior regions than in the interior region for the reason mentioned earlier, in Example 2, sintering of the main phase grains of the exterior regions readily proceeded and the number of pores was reduced due to a higher "RA" content of the interior region than the exterior regions. Also, in Example 2, a sufficient amount of "RA" was able to be solid-dissolved in the main phase grains of the inner dielectric layers. It is assumed that, in Example 2, this led to a better PCBT rating compared to when $D_{RAc}/D_{RAa}$ was less than 3.0 (Example 7).

According to Tables 4B and 4C, it was confirmed that, when both r1<r2<r3<r4<r5 and r5/r1>2.0 were satisfied (Examples 2 and 8), the withstand voltage rating and the PCBT rating were better compared to when not both r1<r2<r3<r4<r5 and r5/r1>2.0 were satisfied (Example 1).

In Examples 2 and 8, both r1<r2<r3<r4<r5 and r5/r1>2.0 were satisfied. In Examples 2 and 8, because the concentrations of "RA" and "RB" gradually changed from the first layers, where the interior region and the exterior regions joined, to the fifth layers, difference between stress in the interior region and stress in the exterior regions could be further reduced. It is assumed that, in Examples 2 and 8, this led to a better withstand voltage rating and a better PCBT rating compared to when not both r1<r2<r3<r4<r5 and r5/r1>2.0 were satisfied (Example 1).

REFERENCE NUMERALS

2 . . . multilayer ceramic capacitor
4 . . . element body
13 . . . interior region
10 . . . inner dielectric layer
12 . . . internal electrode layer
13b . . . second region
13c . . . third region
15 . . . exterior region
11 . . . outer dielectric layer
15a . . . first region
6 . . . external electrode

What is claimed is:

1. A multilayer electronic device comprising:
an element body including an interior region and an exterior region, the interior region including inner dielectric layers and internal electrode layers laminated alternately, the exterior region including an outer dielectric layer and being disposed outwards from the interior region in a lamination direction; and
a pair of external electrodes disposed on a surface of the element body and connected to the internal electrode layers,
wherein
the inner dielectric layers and the outer dielectric layer include a main component and a subcomponent, the main component being included in a main phase grain of the inner dielectric layers and a main phase grain of the outer dielectric layer and having a perovskite crystal structure represented by a general formula $ABO_3$, and the subcomponent including "RE", "M", and Si, where
"A" includes at least one selected from the group consisting of Ba, Sr, and Ca,
"B" includes at least one selected from the group consisting of Ti, Zr, and Hf,
"RE" includes at least one selected from the group consisting of Yb, Y, Ho, Dy, Tb, Gd, and Eu, and
"M" includes at least two selected from the group consisting of Mg, Mn, V, and Cr; and
$D_{RAa} < D_{RAb} < D_{RAc}$ and $D_{RBa} > D_{RBb} > D_{RBc}$ are satisfied, where
"RA" includes an element having a highest mole ratio among "RE" in the inner dielectric layers of a third region at a center of the interior region in the lamination direction,
"RB" includes an element having a highest mole ratio among "RE" in a first region at a center of the exterior region in the lamination direction,
"RA" and "RB" are different from each other,
$D_{RAa}$ is an "RA" content of the first region in terms of $RA_2O_3$ with respect to 100 parts by mol of the main component in the first region,
$D_{RAb}$ is an "RA" content of the inner dielectric layers of a second region in terms of $RA_2O_3$ with respect to 100 parts by mol of the main component in the inner dielectric layers of the second region, the second region being disposed in the interior region and outwards from the third region in the lamination direction,
$D_{RAc}$ is an "RA" content of the inner dielectric layers of the third region in terms of $RA_2O_3$ with respect to 100 parts by mol of the main component in the inner dielectric layers of the third region,
$D_{RBa}$ is an "RB" content of the first region in terms of $RB_2O_3$ with respect to 100 parts by mol of the main component in the first region,
$D_{RBb}$ is an "RB" content of the inner dielectric layers of the second region in terms of $RB_2O_3$ with respect to 100 parts by mol of the main component in the inner dielectric layers of the second region, and
$D_{RBc}$ is an "RB" content of the inner dielectric layers of the third region in terms of $RB_2O_3$ with respect to 100 parts by mol of the main component in the inner dielectric layers of the third region.

2. The multilayer electronic device according to claim 1, wherein $C_{REc} > C_{REa}$ is satisfied, where $C_{REa}$ is an "RE" content of the first region in terms of $RE_2O_3$ in 100 parts by mass of the first region, and $C_{REc}$ is an "RE" content of the inner dielectric layers of the third region in terms of $RE_2O_3$ in 100 parts by mass of the inner dielectric layers of the third region.

3. The multilayer electronic device according to claim 1, wherein $D_{RBa}$ is 0.7 parts by mol or more;

$D_{RAc}$ is 0.7 parts by mol or more; and $D_{RAc}/D_{RAa} \geq 3$ is satisfied.

4. The multilayer electronic device according to claim 1, wherein $r1 < r2 < r3 < r4 < r5$ and $r5/r1 > 2.0$ are satisfied, provided that $r_n$ (n=1 to 5) is a ratio ($D_{RAn}/D_{RBn}$) of $D_{RAn}$ to $D_{RBn}$ of an n-th layer of the inner dielectric layers in the lamination direction, where n-th is any ordinal number from first (n=1) to fifth (n=5), the first corresponding to an outermost layer of the inner dielectric layers, $D_{RAn}$ is an "RA" content of the n-th layer in terms of $RA_2O_3$ with respect to 100 parts by mol of the main component in the n-th layer, and $D_{RBn}$ is an "RB" content of the n-th layer in terms of $RB_2O_3$ with respect to 100 parts by mol of the main component in the n-th layer.

* * * * *